UNITED STATES PATENT OFFICE.

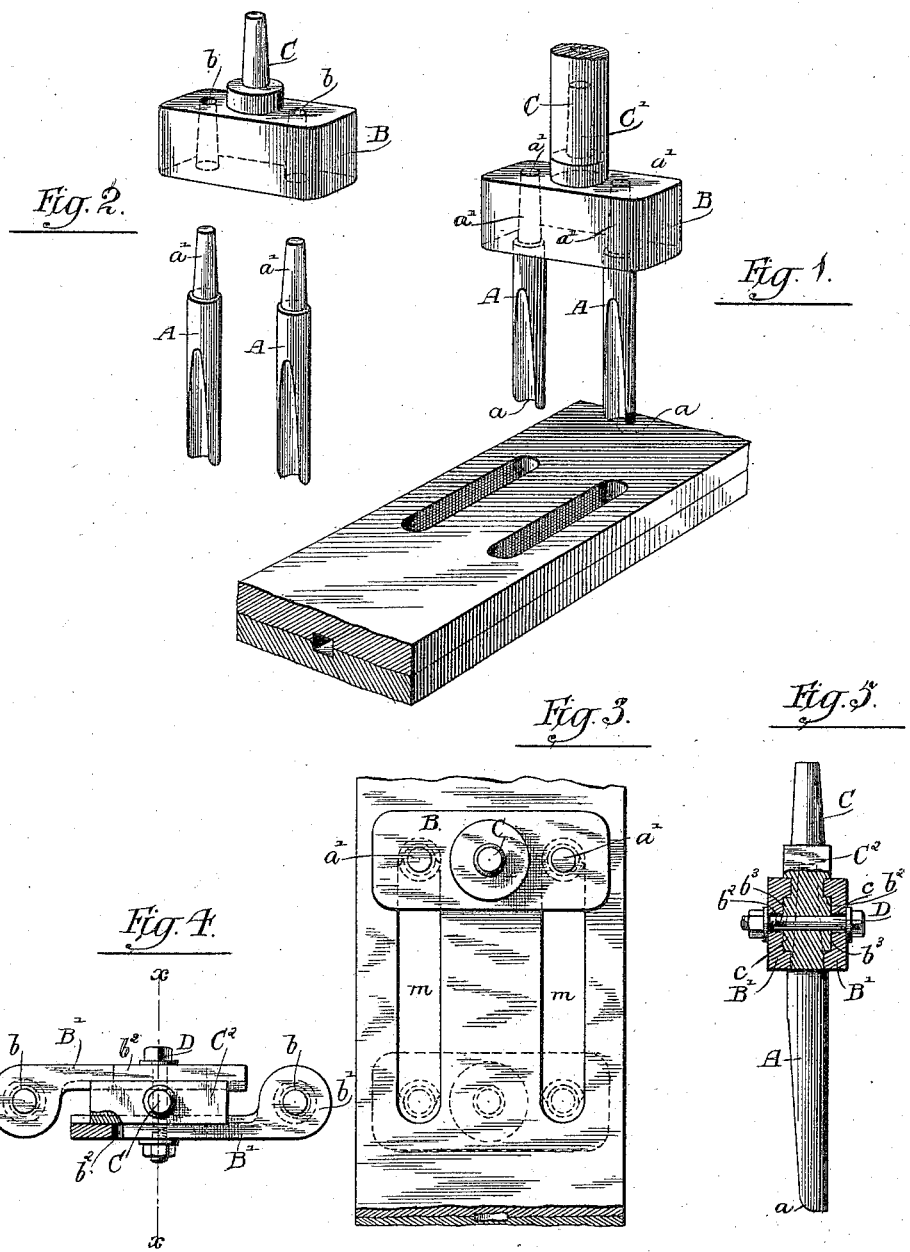

FRANCIS V. PHILLIPS, OF CHICAGO, ILLINOIS, ASSIGNOR OF TWO-THIRDS TO CHARLES H. SMITH AND JOHN HEWITT, BOTH OF SAME PLACE.

MORTISING-TOOL.

SPECIFICATION forming part of Letters Patent No. 363,080, dated May 17, 1887.

Application filed September 23, 1886. Serial No. 214,302. (No model.)

*To all whom it may concern:*

Be it known that I, FRANCIS V. PHILLIPS, of Chicago, in the county of Cook and State of Illinois, have invented certain new and useful Improvements in Mortising-Tools; and I do hereby declare that the following is a full, clear, and exact description thereof, reference being had to the accompanying drawings, and to the letters of reference marked thereon, which form a part of this specification.

This invention relates to improvements in duplex mortising-tools; and it consists in the matters hereinafter set forth, and pointed out in the claims.

The tool described is intended more especially for use in connection with a rotatable spindle or tool holder of a mortising-machine to simultaneously cut the twin mortises in window-stiles to receive the sash-cord guides.

A mortising-tool embodying my invention consists, essentially, of a head affording connection with the half-rotating spindle of a tool-holder of a mortising-machine and two similar and symmetrical mortising-chisels held side by side in said head at exactly equal distances from and on opposite sides of the axis of its rotation. In a tool adapted to be removably attached to the mortising-machine spindle or tool-holder the head will be provided with a central shank adapted for insertion in the tool-holder or spindle, or provided with some other suitable means of securing the duplex tool in the mortising-machine. In the use of the duplex tool constructed as described, the chisels are first made to simultaneously cut the adjacent ends of the twin mortises, and the tool is then reversed to cut the opposite ends of the mortises. The chisels being set exactly equidistant from the axis of rotation of the head, they will retain their proper position with relation to the work, notwithstanding that each chisel in the reversal of the tool is changed from one mortise to the other, and, the chisels being equal and symmetrical, make both mortises symmetrical and alike, notwithstanding each chisel is reversed as it is changed from one mortise to the other.

In the accompanying drawings, illustrating the tool of my invention, only the lower end of the spindle or tool-holder of a mortising-machine is shown, because the construction of such machines is well known.

Figure 1 is a perspective view of a mortising-tool embodying my invention, said tool being shown in position for operation upon the pulley-stiles of a window-frame. Fig. 2 is a perspective view of the tool-head and chisels shown in Fig. 1 detached from each other. Fig. 3 is a plan view of the tool and a piece of work being operated upon, the reversed position of the tool being shown in dotted lines. Fig. 4 is a plan view of another tool embodying the main features of my invention, in which the tool-head is made adjustable, to enable the distances between the chisels to be changed for cutting mortises at a greater or less distance apart. Fig. 5 is a vertical section taken upon line $x\ x$ of Fig. 4.

As shown in the drawings, A A are the mortising-chisels; B, the tool-head; C, the shank thereon, whereby the tool is secured to the tool-holder or spindle of the mortising-machine.

In the particular construction of the parts illustrated the chisels A are made with semicircular cutting-edges $a$, and are cylindric in their upper parts and provided with conical shanks $a'$, fitting in correspondingly-shaped openings $b$ in the head B. The said shanks are made slightly tapering and accurately fitted in the openings $b$, whereby the chisels are securely held in the head. The tool-shank C is similarly shown as made tapering to fit a tool-holder, such as is shown, for instance, at C' in Fig. 1; but said shank may be otherwise made, as found convenient or desirable.

The central axes of the chisels A A are arranged at precisely the same distance from the central axis of the tool-head, or, in other words, that of the shank C at either side thereof, so that when the tool is reversed or turned half-way around by a half-rotation of the spindle C' of the mortising-machine the chisels will remain at exactly the same distance from the vertical line or axis about which the tool is turned. This construction is clearly shown in Fig. 3, in which figure the tool is shown in full lines as in position for operation upon the ends of the mortises $m\ m$ therein shown, and (at the lower part of the figure) in dotted lines as reversed and in position for operating upon the opposite ends of the said mortises.

In the use of a tool constructed as above set forth for mortising the stiles of window-frames to receive sash-pulleys, I prefer to place two stiles in contact with each other, as shown in the perspective view, Fig. 1, and to cut the mortises through both stiles at the same time. The tool-head B may be made solid or in one piece, as shown in Figs. 1, 2, and 3, in which case the chisels will be held at the same distance apart, and different tools will be used when it is desired to cut mortises with a greater or less space between them. Means may, however, be provided for adjusting the distance apart of the chisels, and I have herein shown in Figs. 4 and 5 a construction adapted for this purpose. As illustrated in the said Figs. 4 and 5, the tool-head B is made with two separate parallel parts or plates, B', provided upon their outer ends with heads $b'$ in which the apertures $b$ for the chisel-shanks are formed. Said plates B' B' are clamped upon opposite sides of a metal block, $C^2$, upon which the tool-shank C is formed, by means of a bolt, D, inserted through longitudinal slots $b^2$ in the plates B' and through a central opening in the block $C^2$, the slots $b^2$ $b^2$ obviously enabling the said plates B' to be shifted, as desired, to bring the chisels at a greater or less distance from the axis of the tool-shank. To retain the chisels accurately parallel with each other and with the axis of the tool-shank, the opposing surfaces of the block $C^2$ and the plates B' B' are preferably provided with interfitting grooves and ribs, whereby the said plates B' B' will be held from twisting or rotative movement when the parts are moved for the purpose of adjusting them.

In the particular construction illustrated, the block $C^2$ is provided upon each side with a wide rib, $c$, which engages with a similarly-shaped recess or groove, $b^3$, in the adjacent face of the opposing plate B'. It is entirely obvious, however, that a bodily adjustment of the chisels toward and from the central axis of the tool may be accomplished by other devices than those shown, and I do not therefore limit my invention to the particular details of construction illustrated, except as the latter are herein specifically claimed.

In the case either of the solid head or of the two-part extensible head, each having conical openings or holes for the chisel-shanks, the chisels may be readily changed for others of different size, or when one breaks from striking a knot in the stile or other cause, as frequently happens, a new chisel may be quickly substituted without readjustment and with entire certainty of its proper position.

I claim as my invention—

1. A mortising-tool comprising a block, $C^2$, provided with a shank, C, adapted for insertion in the tool-holder of a mortising-machine, two plates, B' B', adjustably attached to the said block $C^2$, and two chisels severally secured in the said plates B' B', substantially as described.

2. The combination, with the block $C^2$, provided with the shank C, of plates B' B', fitted against the opposite faces of said block, said block and the plates being provided with interfitting ribs and grooves and said plates being provided with longitudinal slots, a bolt inserted through the said block and the slots of the plates for holding the parts together, and two chisels severally secured in the said plates, substantially as described.

3. The duplex reversible and changeable mortising-tool described, comprising a transversely-extended head having a central shank on its upper side for insertion into the rotatable spindle of a mortising-machine and two parallel upwardly-contracted conical holes for the admission of chisels of any size, located at precisely equal distances from the axes of the central shank, together with two similar changeable chisels provided with shanks fitted to the conical holes in the head, substantially as and for the purposes set forth.

In testimony that I claim the foregoing as my invention I affix my signature in presence of two witnesses.

FRANCIS V. PHILLIPS.

Witnesses:
C. CLARENCE POOLE,
CHARLES E. FISHER.